United States Patent [19]
Caldwell et al.

[11] Patent Number: 6,092,131
[45] Date of Patent: Jul. 18, 2000

[54] METHOD AND APPARATUS FOR TERMINATING A BUS AT A DEVICE INTERFACE

[75] Inventors: Barry E. Caldwell, Whitewater; Christopher B. Ross, Wichita, both of Kans.

[73] Assignee: LSI Logic Corporation, Milpitas, Calif.

[21] Appl. No.: 08/901,273

[22] Filed: Jul. 28, 1997

[51] Int. Cl.⁷ .................................................. G06F 13/00
[52] U.S. Cl. ........................................ 710/100; 710/126
[58] Field of Search .................................. 395/280, 281; 710/126, 129

[56] References Cited

U.S. PATENT DOCUMENTS

| | | | |
|---|---|---|---|
| 4,220,876 | 9/1980 | Ray | 307/296 R |
| 4,367,525 | 1/1983 | Brown et al. | 364/200 |
| 4,748,426 | 5/1988 | Stewart | 333/22 |
| 4,831,283 | 5/1989 | Newton | 307/443 |
| 4,920,339 | 4/1990 | Friend et al. | 340/825.52 |
| 4,965,723 | 10/1990 | Kirk et al. | 364/200 |
| 5,029,284 | 7/1991 | Feldaumer et al. | 307/443 |
| 5,099,137 | 3/1992 | Lattin, Jr. | 307/147 |
| 5,101,481 | 3/1992 | Anger et al. | 395/325 |
| 5,120,909 | 6/1992 | Kutz et al. | 178/63 R |
| 5,157,771 | 10/1992 | Losi et al. | 395/325 |
| 5,191,581 | 3/1993 | Woodbury et al. | 370/85.9 |
| 5,204,669 | 4/1993 | Dorfe et al. | 340/825.52 |
| 5,239,559 | 8/1993 | Brach et al. | 375/36 |
| 5,239,658 | 8/1993 | Yamamura et al. | 395/800 |
| 5,265,038 | 11/1993 | Kowk | 364/572 |
| 5,313,105 | 5/1994 | Samela et al. | 307/99 |
| 5,313,595 | 5/1994 | Lewis et al. | 395/325 |
| 5,327,114 | 7/1994 | Straate et al. | 340/286.06 |
| 5,338,979 | 8/1994 | Mammano et al. | 307/443 |
| 5,367,647 | 11/1994 | Coulson et al. | 395/325 |
| 5,382,841 | 1/1995 | Feldbaumer | 326/26 |
| 5,410,141 | 4/1995 | Koenck et al. | 235/472 |
| 5,422,580 | 6/1995 | Mandel et al. | 326/30 |
| 5,434,516 | 7/1995 | Kosco | 326/30 |
| 5,450,425 | 9/1995 | Gunn et al. | 371/67.1 |

(List continued on next page.)

FOREIGN PATENT DOCUMENTS

| | | | |
|---|---|---|---|
| 0076921 | 9/1982 | European Pat. Off. | G06F 11/34 |
| 0531630 | 3/1993 | European Pat. Off. | G06F 13/40 |
| 0645716 | 8/1994 | European Pat. Off. | G06F 13/40 |
| 0671691 | 2/1995 | European Pat. Off. | G06F 13/12 |
| 0742612 | 11/1996 | European Pat. Off. | H01R 43/26 |
| 0575237 | 6/1993 | France | G06F 13/12 |
| 9408305 | 9/1993 | WIPO | G06F 13/40 |

OTHER PUBLICATIONS

"Automatic Small Computer System Interface Termination Circuit for Narrow/WIDE Devices on Wide Bus" IBM Technical Disclosure Bulletin. vol. 40, No. 4, Apr., 1997, New York, US pp. 79–82, XP000728275.

"BI–0316 Mass Storage Module" Dec. 6, 1996, Brand Innovators B.V. X0002071927, Available from Internet URL: http//www.brandinnovators.com/manual/bi0316/book)33.htm.

VLSI and Computer Peripherals, May 8–12, 1989; VLSI Based Tools for Monitoring Bus Communication Channels; F. Gregoretti et al; 1989 IEEE; p. 4–81–84.

*Primary Examiner*—Ayaz R. Sheikh
*Assistant Examiner*—Jigar Pancholi

[57] ABSTRACT

A method for automatically terminating a bus that is dependent upon whether devices are coupled to ports of a device interface is disclosed. The method includes the steps of (a) generating a first sensing voltage having a voltage level equal to one of at least three levels; (b) generating a first control voltage having a fourth level when the voltage level of the first sensing voltage has a first predetermined logical relationship to a first reference voltage; and (c) terminating a first plurality of lines of the bus at the device interface when the first control voltage is equal to the fourth level. An apparatus suitable for implementing the above method is also disclosed.

22 Claims, 3 Drawing Sheets

U.S. PATENT DOCUMENTS

| | | | |
|---|---|---|---|
| 5,455,926 | 10/1995 | Keele et al. | 395/404 |
| 5,465,042 | 11/1995 | Samela et al. | 324/71.1 |
| 5,467,453 | 11/1995 | Kocis | 395/281 |
| 5,469,554 | 11/1995 | Tucker et al. | 395/420 |
| 5,473,264 | 12/1995 | Mader et al. | 326/30 |
| 5,495,584 | 2/1996 | Holman, Jr. et al. | 395/308 |
| 5,510,701 | 4/1996 | Samela et al. | 324/71.1 |
| 5,511,229 | 4/1996 | Tsujimoto | 395/851 |
| 5,546,017 | 8/1996 | Vitunic | 326/30 |
| 5,553,250 | 9/1996 | Miyagawa et al. | 395/309 |
| 5,555,510 | 9/1996 | Verseput et al. | 364/514 |
| 5,564,024 | 10/1996 | Pemberton | 395/283 |
| 5,568,046 | 10/1996 | Samela et al. | 324/71.1 |
| 5,574,946 | 11/1996 | Sala | 395/825 |
| 5,583,448 | 12/1996 | Corder et al. | 326/30 |
| 5,585,741 | 12/1996 | Jordan | 326/30 |
| 5,586,271 | 12/1996 | Parrett | 395/283 |
| 5,613,074 | 3/1997 | Galloway | 395/280 |
| 5,635,853 | 6/1997 | Kikinis | 326/30 |
| 5,664,221 | 9/1997 | Amberg et al. | 395/829 |
| 5,680,537 | 10/1997 | Byers et al. | 395/182.03 |
| 5,680,555 | 10/1997 | Bodo et al. | 395/306 |
| 5,715,409 | 2/1998 | Bucher et al. | 395/309 |
| 5,751,977 | 5/1998 | Alexander | 395/306 |
| 5,764,925 | 6/1998 | Noonan | 395/281 |
| 5,768,621 | 6/1998 | Young | 395/844 |
| 5,781,028 | 7/1998 | Decuir et al. | 326/30 |

METHOD AND APPARATUS FOR TERMINATING A BUS AT A DEVICE INTERFACE

BACKGROUND OF THE INVENTION

The present invention relates generally to automatic termination of buses to enhance data transmission quality, and more particularly to a method and apparatus for terminating a bus at a device interface.

Today's standard computer architectures call for a number of separate components, such as a central processing unit ("CPU"), memory, ports and peripheral devices to be coupled together by electrical buses to provide a pathway for data between the various components. Electrical buses are simply groups of conductors (or lines) designed to operate as a group.

Components transmit data over buses by changing voltages on the various lines of the bus. In binary digital computers, each line in a bus is capable of assuming one of two possible states at a given moment. These states are represented by presence or absence of a voltage, or potential difference relative to ground, on each of the lines.

In the real world, buses are real electrical conductors and therefore contain impedance just as do all real conductors. This impedance traps electrical charge within the line, presenting, in a sense, a momentum against which the change must take place. When the line is directed to change from a binary one to a binary zero (meaning a grounding of the line), it resists the change, typically causing a voltage oscillation at the point of transition (termed "ringing"). This ringing may be of sufficient magnitude as to cause components reading data from the bus to misread the oscillation as the presence of a voltage (a binary one) instead of the intended binary zero, thereby corrupting the flow of data. Therefore, in such conductors, it is standard practice to provide a means by which to dissipate the electrical charge quickly and to damp the ringing, so as to restore data transmission fidelity. Damping is achieved through use of a terminator, which can include a plurality of resistive elements or active switches.

Some buses require terminators at each end of the bus to provide effective damping. One such bus is the small computer systems interface ("SCSI") bus. The SCSI bus is designed to operate in conjunction with microcomputers (also termed personal computers or "PCs") to provide an interface to SCSI standard peripheral devices. SCSI buses require a device interface card or controller card to manage communication of data between the PC and the SCSI devices and between the SCSI devices themselves. In PCs, this device interface card is typically placed in a slot within the main chassis of the PC.

The device interface card contains a controller that manages the SCSI bus and at least one SCSI port allowing SCSI devices to couple to the card. SCSI devices are daisy chained together with a common cable. All SCSI devices operate on common signals, and both ends of the cable are terminated with hardware terminators. The terminators, that can be connected to either SCSI devices or to the SCSI cable itself, as stated above, are required to make data transfers on the SCSI bus reliable.

Devices connected to SCSI chains must have the correct number of terminators for proper operation and to prevent damage to the device interface card. In systems that utilize SCSI devices, there can be no more than two terminators in a chain of SCSI devices, one at each end of the physical chain. This means that, if more than two SCSI devices are connected in a SCSI daisy chain, the middle device(s) on the cable must not have terminators coupled to the SCSI bus.

Some device interfaces provide two SCSI ports. One port (the "external port") is fitted on a mounting bracket attached to the card, thereby exposing it outside the main chassis when the card is mounted therein. This arrangement allows SCSI devices external to the main chassis to couple to the device interface card via the external port. Another port (the "internal port") is mounted to the device interface card such that it is exposed in the interior of the main chassis, allowing SCSI devices to be physically mounted within the main chassis and coupled to the internal port.

Since the SCSI bus must be terminated at each end, if both the internal and external ports of the device interface are coupled to SCSI devices, then the device interface does not terminate the bus because the device interface is located in the middle of the bus. However, the devices at the ends of the bus would be required to terminate their respective ends of the bus in order to maintain proper termination of the bus. On the other hand, if a SCSI device is coupled to either one (but not the other) of the ports, then the device interface terminates the bus at the device interface because the device interface is located at one end of the bus. The SCSI device at the other end of the bus would be required to terminate its respective end of the bus in order to maintain proper termination of the bus.

Properly terminating the SCSI bus is even further complicated due to the fact that both narrow and wide SCSI bus widths exists and customers desire device interface cards that can simultaneously accommodate both SCSI bus widths. One way to address this desire is to add an additional port to the device interface card. For example, the device interface may include an external wide port, an internal wide port, and an internal narrow port. This complicates the termination of the SCSI bus because the narrow SCSI bus includes only fifty (50) conductors whereas the wide SCSI bus includes sixty-eight (68) conductors. Therefore, depending on which ports of the device interface have devices coupled to them, the device interface card may need to terminate the SCSI bus differently.

For example, if a narrow SCSI device is coupled to the internal narrow port and a wide SCSI device is coupled to the external wide port, the device interface is in the middle of the SCSI bus with respect to the narrow portion of the SCSI bus (the 50 conductors common to both a narrow SCSI bus and a wide SCSI bus); however, with respect to the wide portion of the SCSI bus (the remaining 18 conductors of a wide SCSI bus not in common with a narrow SCSI bus) the device interface is at an end of the SCSI bus. Therefore, to properly terminate the SCSI bus in the above example, the wide SCSI device would need to terminate both the wide and narrow portions of the SCSI bus, the narrow SCSI device would need to terminate the narrow portion of the SCSI bus, and the device interface would need to terminate the wide portion of the SCSI of the SCSI bus.

In the past, users were required to flip configuration switches, to install hardware jumpers, or to install terminators on the device interface when the device interface was at an end of a portion of the SCSI bus. If a user then added SCSI devices to or removed SCSI devices from the SCSI bus, then, in order to maintain proper termination of the SCSI bus, the user may need to manually re-configure the device interface by flipping switches, installing hardware jumpers, or removing terminators depending upon whether the location of the device interface with respect to the SCSI bus had changed.

It is undesirable to force a user, who may not be knowledgeable about SCSI buses and their need for termination and who may be uncomfortable with invading the main chassis, to flip configuration switches, to install jumpers, or to install terminators. What is needed therefore, is a method and apparatus for automatically determining whether SCSI devices are coupled to ports of a device interface and to either enable or disable terminators as a function of the determination.

SUMMARY OF THE INVENTION

In accordance with one embodiment of the present invention, there is provided a method of terminating a bus in a device interface. The method includes the steps of: (a) generating a first sensing voltage having a voltage level equal to one of at least three levels, wherein the voltage level of the first sensing voltage is dependent upon whether a first device is coupled to a first port of the device interface and whether a second device is coupled to a second port of the device interface; (b) generating a first control voltage having a fourth level when the voltage level of the first sensing voltage has a first predetermined logical relationship to a first reference voltage; and (c) terminating a first plurality of lines of the bus at the device interface when the first control voltage is equal to the fourth level.

Pursuant to another embodiment of the present invention, there is provided a device interface for controlling a bus. The device interface includes a first port, a second port, a first voltage generator, a first comparator, and a first terminator. The first voltage generator is coupled to the first port and to the second port, and the first comparator is coupled to an output of the first voltage generator. The first terminator is coupled to a first plurality of lines of the bus and to the first comparator.

The first port is configured to receive and to couple a first device to the bus, and the second port is configured to receive and to couple a second device to the bus. The first voltage generator is configured to generate, upon the output of the first voltage generator, a first sensing voltage having a voltage level equal to one of at least three levels wherein the voltage level of the first sensing voltage is dependent upon whether the first device is coupled to the first port and whether the second device is couple to the second port. The first comparator is configured to compare the voltage level of the first sensing voltage to a first reference voltage and to generate a first control voltage having a fourth level when the voltage level of the first sensing voltage has a first predetermined logical relationship to a first reference voltage. Finally, the first terminator is configured to terminate the first plurality of lines when the first control signal is of the fourth level.

It is an object of the present invention to provide an improved device interface.

It is a further object of the present invention to provide a method and apparatus for automatically terminating a bus at a device interface.

It is yet another object of the present invention to provide a method and apparatus that may be used with terminators having various enabling voltage levels.

It is yet another object of the present invention to provide a method and apparatus that maintains proper termination at a device interface which supports devices of different bus widths.

The above and other objects, features, and advantages of the present invention will become apparent from the following description and the attached drawings.

DETAILED DESCRIPTION OF THE PREFERRED EMBODIMENT

Figure 1:
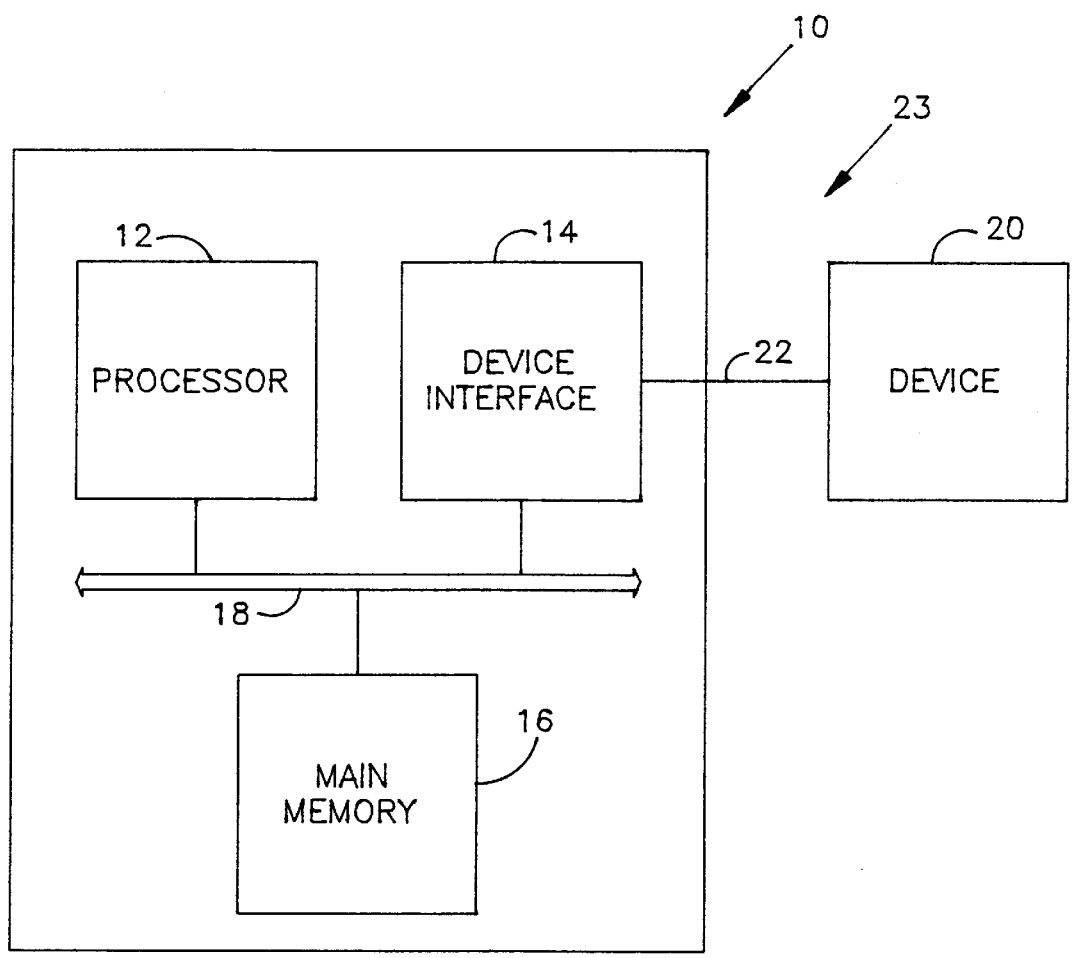
FIG. 1 shows a computer system suitable for incorporating the features of the present invention therein.

While the invention is susceptible to various modifications and alternative forms, a specific embodiment thereof has been shown by way of example in the drawings and will herein be described in detail. It should be understood, however, that there is no intent to limit the invention to the particular form disclosed, but on the contrary, the intention is to cover all modifications, equivalents, and alternatives falling within the spirit and scope of the invention as defined by the appended claims.

Referring now to FIG. 1, there is shown a diagram of a computer system 10 having a processor 12, a device interface 14, a main memory 16, a system bus 18, and a device 20 coupled to the device interface 14 by a cable or ribbon 22. The system bus 18 includes several conductors or lines which operatively couple the processor 12, the device interface 14, and the main memory 16 together. The processor 12 fetches, decodes, and executes instructions stored in the main memory 16. The processor 12 also manages the transfer of data to and from the device interface 14. Furthermore, by executing a device driver stored in the main memory 16, the processor 12 accesses data of the device 20 via the device interface 14.

There is also shown in FIG. 1 a simple peripheral bus 23. The peripheral bus 23 consists of several conductors or lines that operatively couple devices such as device 20 to the device interface 14. As will be discussed in more detail with reference to FIG. 3, the peripheral bus 23 may include more than one cable and may operatively couple more than one device to the device interface 14. However, as depicted in FIG. 1, the peripheral bus 23 consists of the single cable 22 and its several conductors.

The device interface 14 is sometimes referred to as a host controller card or a host adapter. The name comes from the fact that the device interface 14 is typically a controller card plugged into an expansion slot of a host computer 10 and provides the electrical and programming interface between the host processor 12 and devices coupled to the device interface 14. While this device interface 14 is typically a separate hardware card coupled to the system bus 18 via an expansion slot of the computer 10, the device interface 14 could alternatively be integrated circuitry on the main system board of the computer 10.

Figure 2:
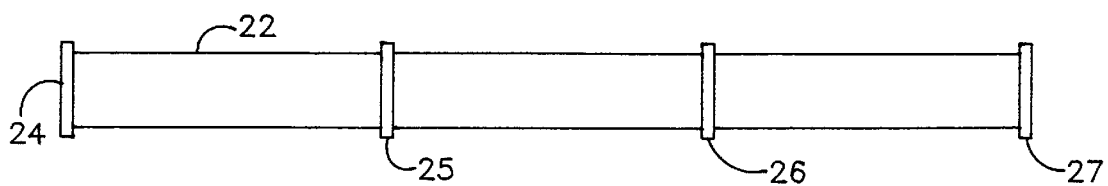
FIG. 2 shows a cable suitable for coupling devices in a daisy chain fashion.

Now referring to FIG. 2, there is shown the cable or ribbon 22 suitable for coupling devices to the device interface 14 in a daisy chain fashion. The cable 22 typically has a connector 24 that allows the cable 22 to be detachably coupled to a receiving connector or port of the device interface 14. The cable 22 also has various connectors 25, 26, 27 for detachably coupling multiple devices in a daisy chain fashion. The cable 22 as depicted would allow up to three devices to be coupled to the cable 22; however, cables having more or less connectors would also be suitable.

Furthermore, due to the manner in which cables such as cable 22 are typically manufactured, a device must be coupled to the end connector 27, which is furthest from the connector 24, before devices may be coupled to the middle connectors 25 and 26. In other words, if only one device were coupled to cable 22, the one device would need to be coupled to end connector 27, and if two devices were coupled to cable 22, one device would need to be coupled to end connector 27 and the other device could be coupled to either middle connector 25 or middle connector 26.

Figure 3:
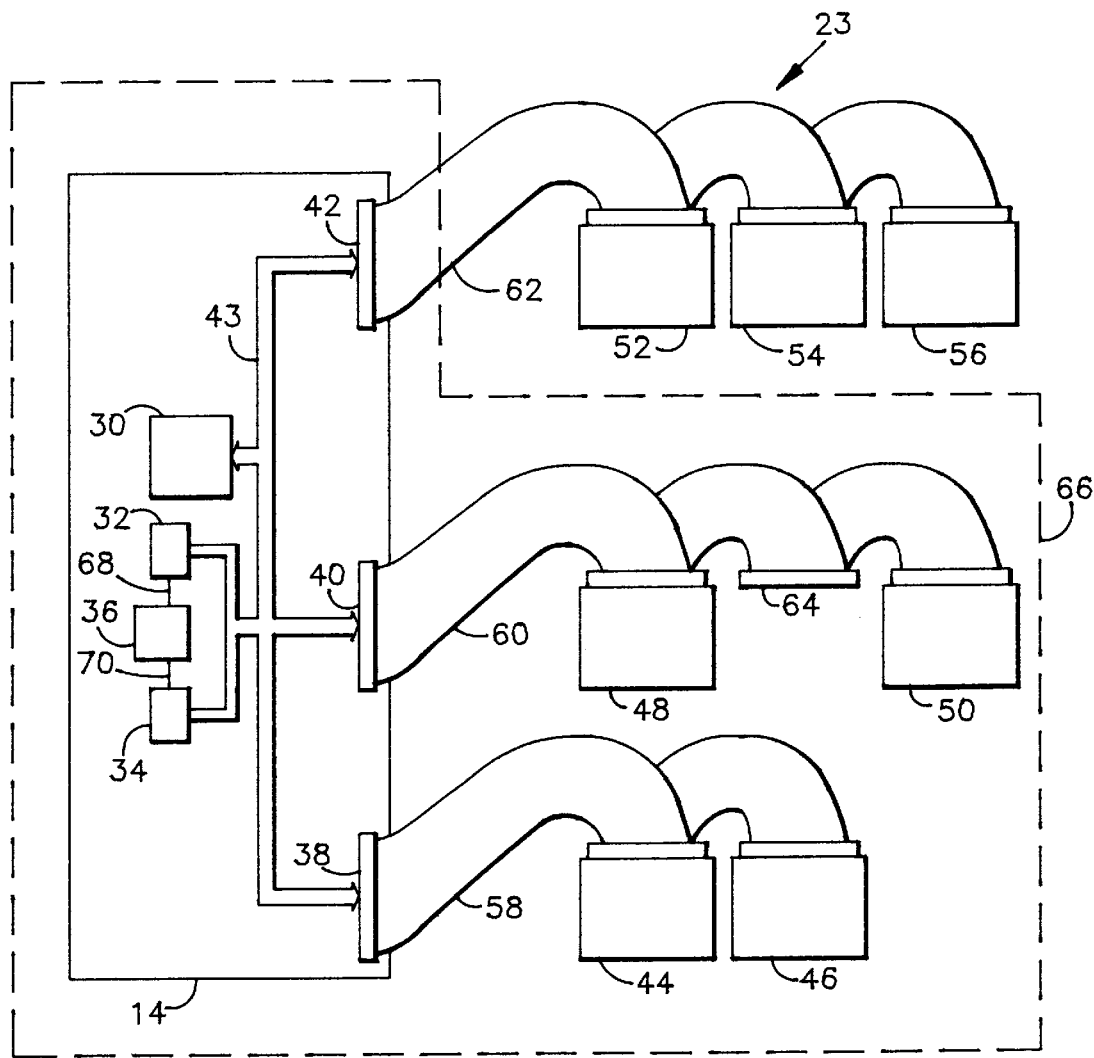
FIG. 3 shows a device interface with several peripheral devices coupled thereto and which incorporates features of the present invention therein.

Referring now to FIG. 3, there is depicted the device interface 14 with several peripheral devices 44, 46, 48, 50, 52, 54, and 56 coupled thereto. In the preferred embodiment, the device interface 14 includes a SCSI bus controller 30, a wide terminator or terminating circuit 32, a narrow terminator or terminating circuit 34, a termination control 36, a narrow internal SCSI connector or port 38, a wide internal SCSI connector or port 40, a wide external SCSI connector or port 42, and an interface bus 43 which operatively couples the controller 30, the wide terminator 32, and the narrow terminator 34 to the ports 38, 40, and 42.

The SCSI bus controller 30, in the preferred embodiment, is a SCSI interface controller chip 53C825 available from Symbios Logic, Inc., Ft. Collins, Colo. (previously known as NCR Corporation, Microelectronics Products Division), and provides an interface between the SCSI peripheral bus 23 and the computer system 10. This SCSI bus controller 30 transmits and receives data and SCSI control signals across the peripheral bus 23 (the SCSI protocol and interface signals are well known in the art, and need not be further described).

Furthermore, in a preferred embodiment of the invention, the terminators 32 and 34 are either UC5613 terminators manufactured by the Unitrode Corporation or a DS2105 terminator manufactured by Dallas Semiconductor. The UC5613 terminator provides a DISCNCT (disconnect) pin that when forced to a low voltage state causes the UC5613 terminator to terminate the bus lines that are coupled to the UC5613 terminator. Therefore, the UC5613 terminator is an active low enabled terminator since the UC5613 terminator terminates bus lines in response to a low voltage signal. In contrast, the DS2105 terminator provides a $\overline{PD}$ (power down) pin that when forced to a high voltage state causes the DS2105 terminator to terminate the bus lines that are coupled to the DS2105 terminator. Therefore, the DS2105 terminator is an active high enabled terminator since the DS2105 terminator terminates bus lines in response to a high voltage signal.

The termination control 36 is coupled to the terminators 32 and 34 by control lines 68 and 70. The termination control 36 uses the control lines 68 and 70 to selectively enable/disable the terminators 32 and 34 in order to maintain proper termination of the peripheral bus 23. The termination control 36 is discussed in further detail below in regard to FIG. 4.

The ports 38, 40, and 42 allow for internal narrow SCSI devices, internal wide SCSI devices, and external wide SCSI devices to be used with the device interface 14. The distinction between internal and external pertains to whether the devices are internal or external to the particular computer housing 66 in which the device interface 14 resides. For example, as depicted in FIG. 3, an internal narrow device chain which includes narrow cable 58 and devices 44 and 46 is coupled to the port 38; an internal wide device chain which includes wide cable 60 and devices 48, and 50 is coupled to the port 40; and an external wide device chain which includes wide cable 62 and devices 52, 54, and 56 is coupled to port 42.

It should be noted that as depicted in FIG. 3, three separate device chains are coupled to the device interface 14 via ports 38, 40, and 42. This configuration would violate the daisy-chain connection scheme of the SCSI protocol. As a result, device interface 14 in the preferred embodiment only supports chains of devices coupled to up to two ports at a single time. This restriction may be implemented in several ways. For example, the device interface 14 may disable one of the ports when devices are coupled to all three ports 38, 40, and 42, or the device interface 14 may transmit an error signal to the processor 12 and disable itself when devices are coupled to all three ports 38, 40, and 42.

The peripheral devices 44, 46, 48, 50, 52, 54, 56 in the preferred embodiment are SCSI disk drives; however other types of SCSI-compliant devices could also be similarly coupled to the device interface 14, such as tape drives, compact disc (CD) drives, RAID devices, and the like. Furthermore, each of these peripheral devices 44, 46, 48, 50, 52, 54, 56 in the preferred embodiment has a mechanism for terminating the peripheral bus 23 at the device. These mechanisms for terminating the peripheral bus 23 may consist of a socket, where an RPAK (a resistor pack) can be manually inserted; a jumper or switch that can be used to manually enable/disable a terminator; or a sensing circuit for automatically enabling/disabling a terminator.

As described in the background, it is desirable to terminate the ends of the peripheral bus 23. For example, if the wide internal chain were not coupled to the internal wide port 40, and both the narrow internal chain and the wide external chain were to remain coupled to their respective ports 38 and 42, then the peripheral bus 23 would include the narrow internal chain, the interface bus 43, and the wide external chain. Therefore, to properly terminate this peripheral bus 23, the last device of the narrow internal chain (device 46) would terminate one end of the narrow portion of the peripheral bus 23 and the last device of the wide external chain (device 56) would terminate the other end of the narrow portion of the peripheral bus 23. Furthermore, the last device of the wide external chain (device 56) would terminate one end of the wide portion of the peripheral bus 23, and the device interface 14 would terminate the other end of the wide portion of peripheral bus 23 by enabling the wide terminator 32.

If, however, the narrow internal chain of FIG. 3 were not coupled to the narrow internal port 38, and both the wide internal chain and the wide external chain were to remain coupled to the wide ports 40 and 42, then the peripheral bus 23 would include the internal wide chain, the interface bus 43, and the external wide chain. Therefore, to properly terminate this peripheral bus 23, the last device of the internal wide chain (device 50) would terminate both the wide and narrow portions of one end of the peripheral bus 23 and the last device of the external wide chain (device 56) would terminate both the wide and narrow portions of the other end of the peripheral bus 23. The device interface 14 in this configuration resides in a middle portion of both the wide and narrow portions of the peripheral bus 23. Therefore, the device interface 14 does not terminate the peripheral bus 23 at the device interface 14 (i.e. the terminators 32 and 34 are disabled ).

Table 1 below depicts the preferred method of terminating the peripheral bus 23 which is dependent upon whether devices are coupled to the ports 38, 40, and 42 of the device interface 14. A "N" indicates that devices are not coupled to or are not present on the respective port, and a "Y" indicates that at least one device is coupled to or is present on the respective port. An "E" indicates that the respective terminator is enabled, thereby terminating the lines of the peripheral bus 23 that are coupled to the terminator, and a "D" indicates that the respective terminator is disabled, thereby not terminating the lines of the peripheral bus 23 that are coupled to the terminator.

TABLE 1

|   | Narrow Port 38 | Wide Port 40 | Wide Port 42 | Wide Terminator 32 | Narrow Terminator 34 |
|---|---|---|---|---|---|
| 1 | N | N | N | E | E |
| 2 | N | N | Y | E | E |
| 3 | N | Y | N | E | E |
| 4 | N | Y | Y | D | D |
| 5 | Y | N | N | E | E |
| 6 | Y | N | Y | E | D |
| 7 | Y | Y | N | E | D |
| 8 | Y | Y | Y | D | D |

Figure 4:
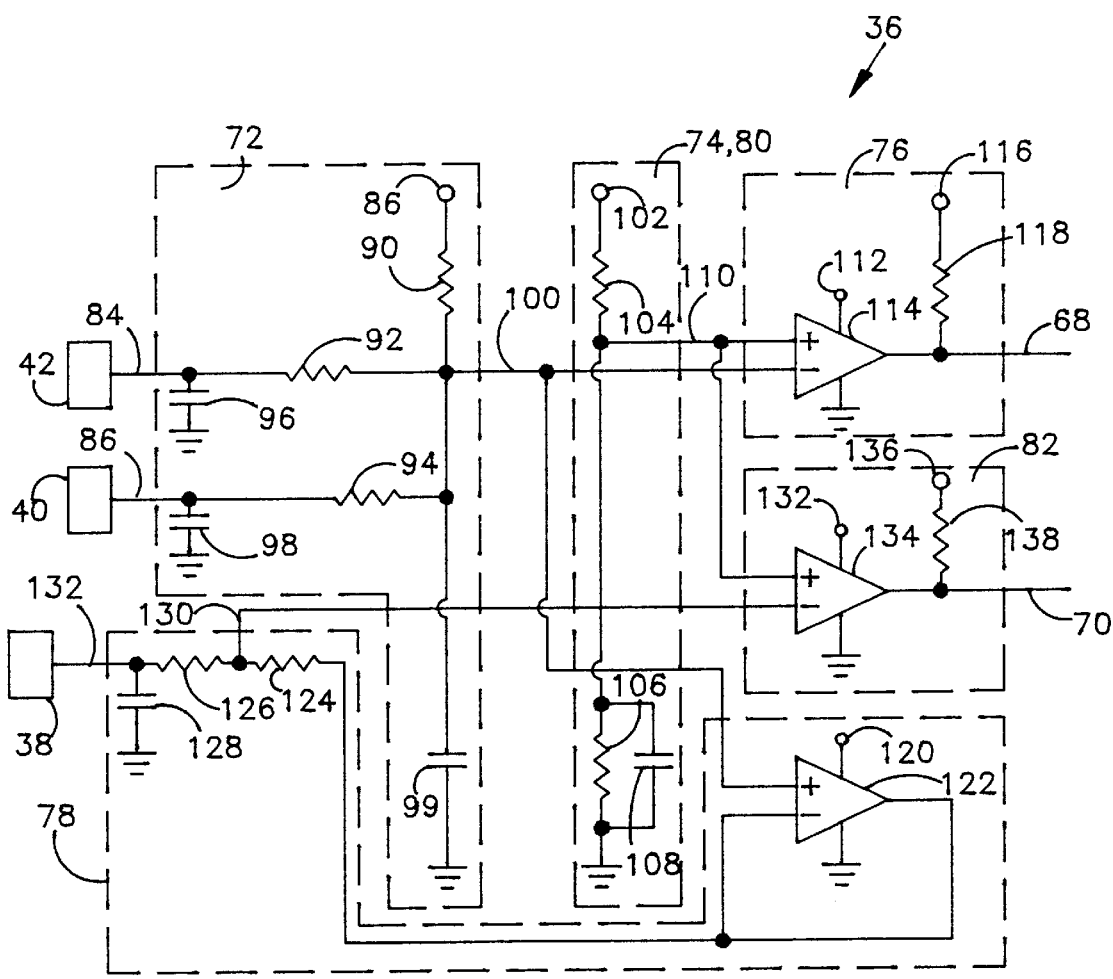
FIG. 4 shows a schematic for a preferred termination control to be used on the device interface of FIG. 3.

A schematic of a preferred embodiment of the termination control 36 that implements the above table is shown in FIG. 4. The termination control 36 includes a first voltage generator 72, a first reference generator 74, a first comparator 76, a second voltage generator 78, a second reference generator 80, and a second comparator 82.

The first voltage generator 72 generates upon an output 100 a first sensing voltage that has a voltage level that is dependent upon whether devices are coupled to the ports 40 and 42. The first voltage generator 72 includes a voltage source 88, resistors 90, 92, 94, capacitors 96, 98, 99, and the output 100. The first voltage generator 72 is coupled to a ground pin of the external wide port 42 via a present1 line 84 and is coupled to a ground pin of the internal wide port 40 via a present2 line 86. The resistor 90 couples the voltage source 88 to the output 100, the resistor 92 couples the present1 line 84 to the output 100, and the resistor 94 couples the present2 line 86 to the output 100.

Furthermore, the capacitor 96 is coupled between the present1 line 84 and a ground potential, the capacitor 98 is coupled between the present2 line 86 and a ground potential, and the capacitor 99 is coupled between the output 100 and a ground potential. In the preferred embodiment, the capacitors 96 and 98 each have a capacitance substantially equal to 1000 pF (pico-Farad), and the capacitor 99 has a capacitance substantially equal to 0.1 $\mu$F (micro-Farad). The capacitors 96, 98, and 99 basically function as filters that help to reduce noise in the first voltage generator 72.

In the preferred embodiment, the voltage source 88 is +12 V (volts) although other values such as +3 V or +5 V are also possible. Furthermore, the resistors 90, 92, and 94 are each 4.75 K$\Omega$ (kilo-ohms), although other values are also possible. The resistors 90, 92, 94 in essence form a voltage divider network between the voltage source 88 and the ports 40 and 42. As should be apparent from FIG. 4, the first sensing voltage that is developed upon the output 100 is substantially equal to the voltage source 88 minus the voltage developed across the resistor 90. What follows is a discussion of the various voltage levels the first sensing voltage obtains dependent upon whether devices are coupled to the ports 40 and 42.

When no devices are coupled to the ports 40 and 42 and the capacitors 96 and 98 are fully charged, no path exists for current to flow through the resistor 90 (except for various leakage currents). As a result, relatively no voltage is developed across the resistor 90 and the first sensing voltage is substantially equal to the voltage source 88 or +12 V.

When a device is coupled to the port 42 and no devices are coupled to the port 40, the device coupled to port 42 essentially grounds the present1 line 84. This grounding of the present1 line 84 provides a path for current to flow through the resistor 90. As a result, current flows through resistor 90, resistor 92, and through the ground provided by the device coupled to the port 42. This current flow causes the voltage of the voltage source 88 to be divided amongst the resistors 90 and 92. Since in the preferred embodiment resistors 90 and 92 have substantially the same resistance, essentially half of the voltage of the voltage source 88 or +6 V is developed across each resistor 90 and 92. Therefore, in the preferred embodiment, the first sensing voltage is substantially equal to +6 V (+12 V minus +6 V) when a device is coupled to the port 42 and no device is coupled to the port 40.

Likewise, when a device is coupled to the port 40 and no devices are coupled to the port 42, the device coupled to port 40 essentially grounds the present2 line 86. This grounding of the present2 line 86 provides a path for current to flow through the resistor 90. As a result, current flows through resistor 90, resistor 94, and through the ground provided by the device coupled to the port 40. This current flow causes the voltage of the voltage source 88 to be divided amongst the resistors 90 and 94. Since in the preferred embodiment resistors 90 and 94 have substantially the same resistance, essentially half of the voltage of the voltage source 88 or +6 V is developed across each resistor 90 and 94. Therefore, in the preferred embodiment, the first sensing voltage is substantially equal to +6 V (+12 V minus +6 V) when a device is coupled to the port 40 and no device is coupled to the port 42.

When devices are coupled to both ports 40 and 42, the devices coupled to ports 40 and 42 essentially ground the present1 line 84 and present2 line 86. This grounding of the present1 line 84 and the present2 line 86 provides a path for current to flow through the resistor 90. As a result, current flows through resistor 90, resistor 92, resistor 94, and through the grounds provided by the devices coupled to the ports 40 and 42. This current flow causes the voltage of the voltage source 88 to be divided amongst the resistors 90, 92 and 94. Since in the preferred embodiment resistors 90, 92 and 94 have substantially the same resistance, essentially two-thirds of the voltage of the voltage source 88 or +8 V is developed across the resistor 90. Therefore, in the preferred embodiment, the first sensing voltage is substantially equal to +4 V (+12 V minus +8 V) when devices are coupled to both ports 40 and 42.

It should be apparent from the above discussion that if the resistor 92 and the resistor 94 have substantially the same resistance, then the first voltage generator 72 generates a first sensing voltage that has a voltage level that is substantially equal to one of three levels at any one point in time. For example, in the preferred embodiment, the first voltage generator 72 generates a first sensing voltage that is substantially equal to +12 V, +6 V, or +4V depending on whether devices are coupled to the ports 40 and 42.

However, if the resistor 92 has a substantially different resistance than the resistor 94, then the first voltage generator 72 would generate a first sensing voltage that has a voltage level that is substantially equal to one of four levels at any one point in time. For example, if resistor 92 has a resistance of 4 K$\Omega$ and resistor 94 has a resistance of 5 K$\Omega$, then first voltage generator would generate a first sensing voltage that is substantially equal to +12 V, +6.2 V, +5.5 V, or +3.8 V depending on whether devices are coupled to the ports 40 and 42.

The first reference generator 74 generates a first reference voltage for use by the first comparator 76. The first reference generator 76 includes a voltage source 102, resistors 104, 106, a capacitor 108, and an output 110. The resistor 104 is coupled between the voltage source 102 and the output 110. The resistor 106 is coupled between the output 110 and a ground potential. Furthermore, the capacitor 108 is coupled between the output 110 and a ground potential. The capacitor 108 in the preferred embodiment has a capacitance substantially equal to 0.1 μF and basically functions as a filter that helps reduce noise in the first reference generator 74.

In the preferred embodiment, the voltage source 102 is +12 V although other values such as +3 V or +5 V are also possible. Furthermore, the resistor 104 has a resistance of 3.01 KΩ and the resistor 106 has a resistance of 2.15 KΩ, although other values are also possible. The resistors 102 and 104 in essence form a voltage divider between the voltage source 102 and the ground potential. As should be apparent from FIG. 4, the first reference voltage is developed upon the output 110 and is substantially equal to the voltage developed across the resistor 106. As a result, in the preferred embodiment, the first reference voltage developed upon output 110 is substantially equal to +5 V.

The first comparator 76 compares the first sensing voltage on output 100 to the first reference voltage on output 110 and generates a control voltage upon control line 68 that is dependent upon a relationship between the first sensing voltage and the first reference voltage. The first comparator 76 includes a voltage source 112, an operational amplifier (op-amp) 114, a voltage source 116, and a resistor 118. The power leads of the op-amp 114 are coupled to the voltage source 112 and a ground potential. The non-inverting input of the op-amp 114 is coupled to the output 110 of the first reference generator 74, and the inverting input of the op-amp 114 is coupled to the output 100 of the first voltage generator 72. The output of the op-amp 114 is coupled to the control line 68. Furthermore, the resistor 118 is coupled between the output of the op-amp 114 and the voltage source 116.

In the preferred embodiment, the voltage source 112 is +12 V (volts) and the voltage source 116 is +5 V, although other values are also possible, and the resistor 118 has a resistance of 4.75 KΩ (kilo-ohms), although other values are also possible. Furthermore the op-amp 114 is a LM393, manufactured by National Semiconductor Corporation of Arlington, Tex.

In the preferred embodiment, the terminators 32 and 34 are active low enabled devices that are enabled with a control voltage having a low voltage level and that are disabled with a control voltage having a high voltage level. Therefore, in order to maintain proper termination of the peripheral bus 23, the first comparator 76 generates in the preferred embodiment a control voltage upon the control line 68 that is substantially equal to the ground potential (+0 V in the preferred embodiment) when the first sensing voltage on output 100 is greater than the first reference voltage on output 110 and that is substantially equal to the voltage source 116 (+5 V in the preferred embodiment) when the first sensing voltage on output 100 is less than the first reference voltage on output 110.

It should be appreciated that the voltage source 116 sets the high voltage level of the control voltage on control line 68. For example, by changing the voltage source 116 to a different voltage such as +3 V, the first comparator 76 will generate a control voltage substantially equal to +3 V when the first sensing voltage on output 100 is less than the first reference voltage on output 110. As a result, the first comparator 76 can be easily modified to support active low enabled terminators that are disabled with different high control voltages.

It should further be appreciated that the first comparator 76 can easily be altered to support active high enabled terminators that are enabled with a control voltage having a high voltage level and that are disabled with a control voltage having a low voltage level. By coupling the non-inverting input of the op-amp 114 to the output 100 instead of the output 110 and coupling the inverting input of the op-amp 114 to the output 110 instead of the output 100, the first comparator 76 would generate a control voltage upon the control line 68 that is substantially equal to the ground potential when the first sensing voltage on output 100 is less than the first reference voltage on output 110 and that is substantially equal to the voltage source 116 when the first sensing voltage on output 100 is greater than the first reference voltage on output 110.

The second voltage generator 78 generates upon an output 130 a second sensing voltage that has a voltage level that is dependent upon the first sensing voltage and that is dependent upon whether devices are coupled to the port 38. The second voltage generator 78 includes a voltage source 120, an op-amp 122, resistors 124, 126, a capacitor 128, and the output 130. The second voltage generator 78 is coupled to a ground pin of the internal narrow port 38 via a present3 line 132. The power leads of the op-amp 122 are coupled to the voltage source 120 and a ground potential. The non-inverting input of the op-amp 122 is coupled to the output 100 of the first voltage generator 72, and the inverting input of the op-amp 122 is coupled to the output of the op-amp 122.

The resistor 124 is coupled between the output of the op-amp 122 and the output 130 of the second voltage generator 78, and the resistor 126 is coupled between the output 130 of the second voltage generator 78 and the present3 line 132. Furthermore, the capacitor 128 is coupled between the present3 line 132 and a ground potential. The capacitor 128 in the preferred embodiment has a capacitance substantially equal to 1000 pF and basically functions as a filter that helps to reduce noise in the second voltage generator 78.

Furthermore, in the preferred embodiment, the voltage source 120 has a voltage substantially equal to +12 V (volts), and the resistors 124 and 126 each have a resistance substantially equal to 4.75 KΩ (kilo-ohms). Furthermore, the op-amp 122, in the preferred embodiment, is a LM358, manufactured by National Semiconductor Corporation of Arlington, Tex.

As can be seen from FIG. 4, the op-amp 122 is configured as a voltage follower. As a result of the output 100 being coupled to the non-inverting input of the op-amp 122, the output of the op-amp 122 essentially follows the voltage level of the first sensing voltage. Furthermore, as can be seen from FIG. 4, the second sensing voltage developed upon output 130 is substantially equal to the voltage on the output of the op-amp 122 minus the voltage developed across the resistor 124.

When no devices are coupled to the port 38 and the capacitor 128 is fully charged, no path exists for current to flow through the resistor 124 (except for various leakage currents). As a result, relatively no voltage is developed across the resistor 124 and therefore the second sensing voltage is substantially equal to the voltage on the output of the op-amp 122 which is also substantially equal to the first sensing voltage on the output 100 of the first voltage generator.

However, when a device is coupled to the port 38, the device coupled to port 38 essentially grounds the present3 line 132. This grounding of the present3 line 132 provides a path for current to flow through the resistor 124. As a result, current flows through resistor 124, resistor 126, and through the ground provided by the device coupled to the port 38. This current flow causes the voltage on the output of the op-amp 122 to be divided amongst the resistors 124 and 126. Since in the preferred embodiment resistors 124 and 126 have substantially the same resistance, essentially half of the voltage on the output of the op-amp 122 is developed across each resistor 124 and 126. Therefore, in the preferred embodiment, the second sensing voltage is substantially equal to the first sensing voltage when no devices are coupled to the port 38 and is substantially equal to some percentage of the first sensing voltage when at least one device is coupled to the port 38.

The second reference generator 80 generates a second reference voltage for use by the second comparator 82. In the preferred embodiment, the first comparator 76 and the second comparator 82 utilize reference voltages that have substantially the same voltage level. As a result, instead of duplicating the hardware of the first voltage generator 74, the second reference voltage is supplied by the output of the first reference generator 74. It should be appreciated that the comparator 82 may be designed to utilize a second reference voltage that has a voltage level that is substantially different than voltage level of the first reference voltage. As the result, the second reference generator 80 would require additional hardware to generate the second reference voltage.

The second comparator 82 compares the second sensing voltage on output 130 to the second reference voltage on output 110 and generates a control voltage upon control line 70 that is dependent upon a relationship between the second sensing voltage and the second reference voltage. The first comparator 82 includes a voltage source 132, an operational amplifier (op-amp) 134, a voltage source 136, and a resistor 138. The power leads of the op-amp 134 are coupled to the voltage source 132 and a ground potential. The non-inverting input of the op-amp 134 is coupled to the output 110 of the second reference generator 80, and the inverting input of the op-amp 134 is coupled to the output 130 of the second voltage generator 78. The output of the op-amp 134 is coupled to the control line 70. Furthermore, and the resistor 138 is coupled between the output of the op-amp 134 and the voltage source 136.

In the preferred embodiment, the voltage source 132 is +12 V (volts) and the voltage source 136 is +5 V, although other values are also possible, and the resistor 138 has a resistance of 4.75 KΩ (kilo-ohms), although other values are also possible. Furthermore the op-amp 134 is a LM393, manufactured by National Semiconductor Corporation of Arlington, Tex.

As stated above, the terminators 32 and 34 in the preferred embodiment are active low enabled devices that are enabled with a control voltage having a low voltage level and that are disabled with a control voltage having a high voltage level. Therefore, in order to maintain proper termination of the peripheral bus 23, the second comparator 82 generates in the preferred embodiment a control voltage upon the control line 70 that is substantially equal to the ground potential (+0 V in the preferred embodiment) when the second sensing voltage on output 130 is greater than the second reference voltage on output 110 and that is substantially equal to the voltage source 136 (+5 V in the preferred embodiment) when the second sensing voltage on output 130 is less than the second reference voltage on output 110.

It should be appreciated that the second comparator 82 like the first comparator 76 can be easily modified to support active low enabled terminators that are disabled with different high control voltages. Furthermore, it should be appreciated that the second comparator 82 like the first comparator 76 can be easily modified to support active high enabled terminators that are enabled with a control voltage having a high voltage level and that are disabled with a control voltage having a low voltage level.

While the invention has been illustrated and described in detail in the drawings and foregoing description, such illustration and description is to be considered as exemplary and not restrictive in character, it being understood that only the preferred embodiment has been shown and described and that all changes and modifications that come within the spirit of the invention are desired to be protected.

What is claimed is:

1. A method of terminating a bus in a device interface, including the steps of:

generating a first sensing voltage having a voltage level equal to one of at least three levels, wherein the voltage level of the first sensing voltage is dependent upon whether a first device is coupled to a first port of the device interface and whether a second device is coupled to a second port of the device interface;

generating a first control voltage having a fourth level when the voltage level of the first sensing voltage has a first predetermined logical relationship to a first reference voltage; and terminating a first plurality of lines of the bus at the device interface when the first control voltage is equal to the fourth level.

2. The method of claim 1, wherein the step of generating the first sensing voltage includes the steps of:

if the first device is not coupled to the first port and if the second device is not coupled to the second port, then forcing the voltage level of the first sensing voltage to a first level;

if the first device is coupled to the first port or if the second device is coupled to the second port, then forcing the voltage level of the first sensing voltage to a second level that is less than the first level; and if the first device is coupled to the first port and if the second device is coupled to the second port, then forcing the voltage level of the first sensing voltage to a third level that is less than the second level.

3. The method of claim 1, wherein the step of generating the first sensing voltage includes the steps of:

if the first device is not coupled to the first port and if the second device is not coupled to the second port, then forcing the voltage level of the first sensing voltage to a first level;

if the first device is coupled to the first port and if the second device is not coupled to the second port, then forcing the voltage level of the first sensing voltage to a second level that is less than the first level;

if the second device is coupled to the second port and if the first device is not coupled to the first port, then forcing the voltage level of the first sensing voltage to a third level that is less than the first level; and if the first device is coupled to the first port and if the second device is coupled to the second port, then forcing the voltage level of the first sensing voltage to a fifth level that is less than the second level and that is less than the third level.

4. The method of claim 1, wherein the step of generating the first control voltage includes the steps of:

comparing the first sensing voltage to the first reference voltage; and forcing the first control voltage to the fourth level when the voltage level of the first sensing voltage is less than the first reference voltage.

5. The method of claim 1, further including the steps of:

generating a second sensing voltage that is dependent upon the first sensing voltage and further dependent upon whether a third device is coupled to a third bus port of the device interface;

generating a second control voltage having a fifth level when the second sensing voltage has a second predetermined logical relationship to a second reference voltage; and terminating at the device interface a second plurality of lines of the bus when the second control voltage is equal to the fifth level.

6. The method of claim 5, wherein the step of generating the second sensing voltage includes the steps of:

if the third device is not coupled to the third port, then forcing the voltage level of the second sensing voltage to be substantially equal to the voltage level of the first sensing voltage; and if the third device is coupled to the third port, then forcing the voltage level of the second sensing voltage to be less than the voltage level of the first sensing voltage.

7. The method of claim 5, wherein the step of generating the second control voltage includes the steps of:

comparing the second sensing voltage to the second reference voltage; and forcing the second control voltage to the fifth level when the voltage level of the second sensing voltage is less than the second reference voltage.

8. A device interface for controlling a bus, comprising:

a first port configured to receive and to couple a first device to the bus;

a second port configured to receive and to couple a second device to the bus;

a first voltage generator coupled to said first port and to said second port, said first voltage generator configured to generate, upon an output of said first voltage generator, a first sensing voltage having a voltage level equal to one of at least three levels, wherein said voltage level of said first sensing voltage is dependent upon whether said first device is coupled to said first port and whether said second device is couple to said second port;

a first comparator coupled to said output of said first voltage generator and configured to compare said voltage level of said first sensing voltage to a first reference voltage and to generate a first control voltage having a fourth level when said voltage level of said first sensing voltage has a first predetermined logical relationship to a first reference voltage; and a first terminator coupled to a first plurality of lines of the bus and to said first comparator, said first terminator configured to terminate said first plurality of lines when said first control voltage is of said fourth level.

9. The device interface of claim 8, wherein the first voltage generator comprises:

a first resistor coupled between a voltage source and said output of said first voltage generator;

a second resistor coupled between said output of said first voltage generator and a ground pin of said first port; and a third resistor coupled between said output of said first voltage generator and a ground pin of said second port.

10. The device interface of claim 8, further including:

a first capacitor coupled between a ground pin of said first port and a ground potential; and a second capacitor coupled between a ground pin of said second port and said ground potential.

11. The device interface of claim 8, wherein said first comparator comprises:

an operational amplifier having an inverting input that is coupled to said first output of said first voltage generator and a non-inverting input coupled to said first reference voltage.

12. The device interface of claim 8, wherein said first comparator comprises:

an operational amplifier having an inverting input that is coupled to said first reference voltage and a non-inverting input coupled to said first output of said first voltage generator.

13. The device interface of claim 12, further comprising:

a resistor coupled between a voltage source and an output of said operational amplifier.

14. The device interface of claim 8, further comprising:

a third port configured to receive and to couple a third device to the bus;

a second voltage generator coupled to said third port, said second voltage generator configured to generate, upon an output of said second voltage generator, a second sensing voltage that is dependent upon said first sensing voltage and further dependent upon whether said third device is coupled to said third port;

a second comparator coupled to said output of said second voltage generator and configured to compare said second sensing voltage to a second reference voltage and to generate a second control voltage having a fifth level when said second sensing voltage has a second predetermined logical relationship to said second reference voltage; and a second terminator coupled to a second plurality of lines of the bus and to said second comparator, said second terminator configured to terminate said second plurality of lines when said second control voltage is equal to said fifth level.

15. The device interface of claim 14, wherein said second voltage generator comprises:

a fourth resistor coupled between said output of said first voltage generator and said output of said second voltage generator; and a fifth resistor coupled between said output of said second voltage generator and a ground pin of said third port.

16. The device interface of claim 14, wherein said second voltage generator comprises:

a voltage follower having an output and an input, said input of said voltage follower coupled to said output of said first voltage generator;

a fourth resistor coupled between said output of said voltage follower and said output of said second voltage generator; and a fifth resistor coupled between said output of said second voltage generator and a ground pin of said third port.

17. The device interface of claim 14, wherein said second comparator comprises:

an operational amplifier having an inverting input that is coupled to said output of said second voltage generator and a non-inverting input coupled to said reference voltage.

18. The device interface of claim 14, wherein the first reference voltage is substantially equal to the second reference voltage.

19. The device interface of claim 14, wherein the fourth level and the fifth level are substantially equal to 5 volts.

20. The device interface of claim 14, wherein the fourth level and the fifth level are substantially equal to ground.

21. A termination control which may be configured to control terminators that utilize different control voltages, comprising:

a first input operable to receive a first signal from a first bus port that is indicative of whether a first device is coupled to said first bus port;

a second input operable to receive a second signal from a second bus port that is indicative of whether a second device is coupled to said second bus port;

a voltage source input operable to receive a voltage that may be one of at least two levels, each corresponding to one of at least two different high control voltages utilized by terminators;

a control output operable to apply a termination control signal to a terminator; and circuitry coupled to said first input, said second input, said voltage source input, and said control output, said circuitry operable to generate upon said control output said termination control signal having a high voltage level or a low voltage level dependent upon said first signal and said second signal, wherein said high voltage level has (i) a first magnitude in response to a first voltage level of said at least two levels being applied to said voltage source input, and (ii) a second magnitude in response to a second voltage level of said at least two levels being applied to said voltage source input.

22. The termination control of claim 21, wherein:

said circuitry is further operable to generate said termination control signal such that said high voltage level of said termination control signal is equal to said voltage applied to said voltage source input.

* * * * *